May 10, 1938.　　　J. O. CARREY　　　2,116,595
SEPARATOR
Filed Aug. 10, 1935　　　3 Sheets-Sheet 1
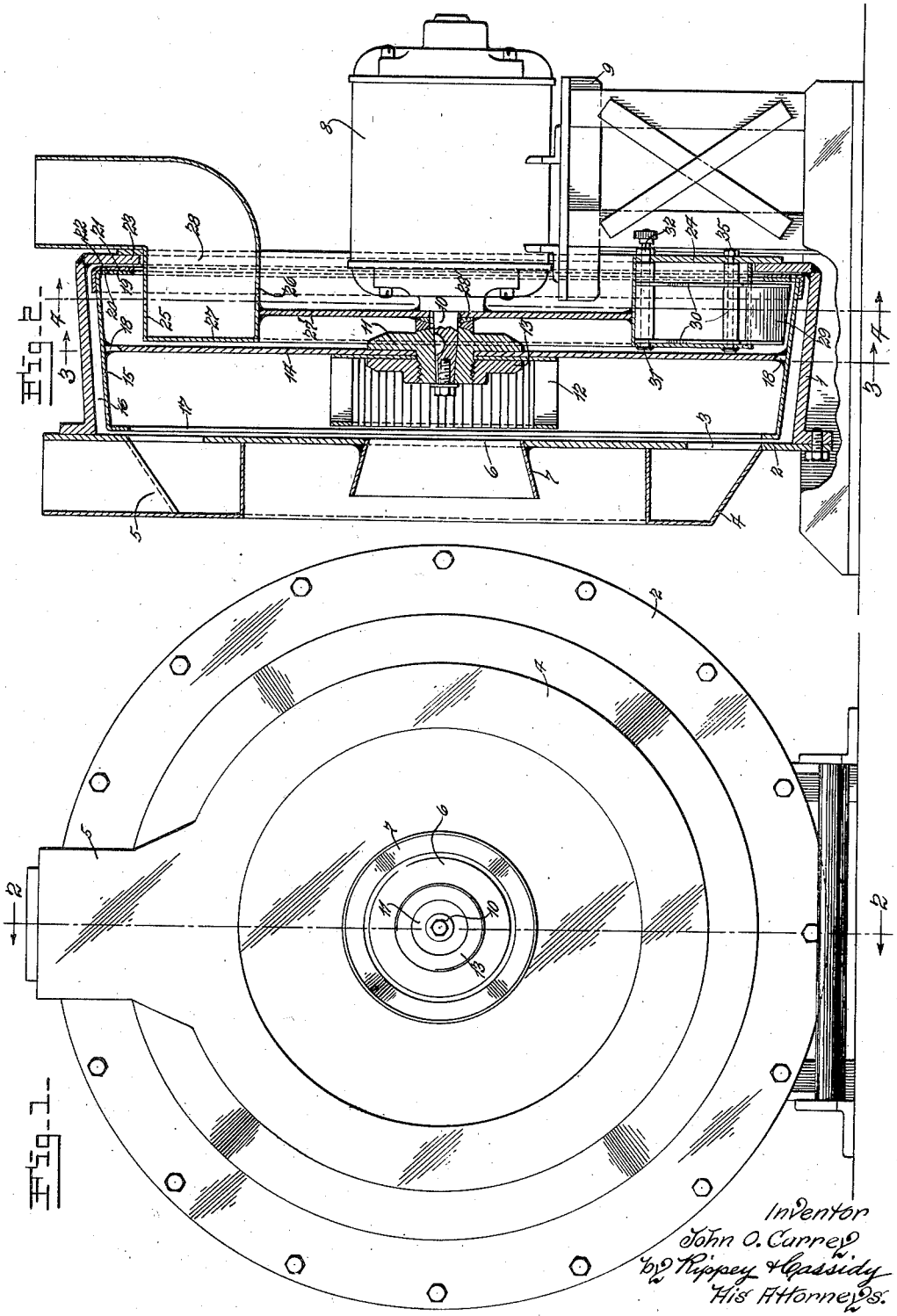
Inventor
John O. Carrey
by Rippey & Cassidy
His Attorneys.

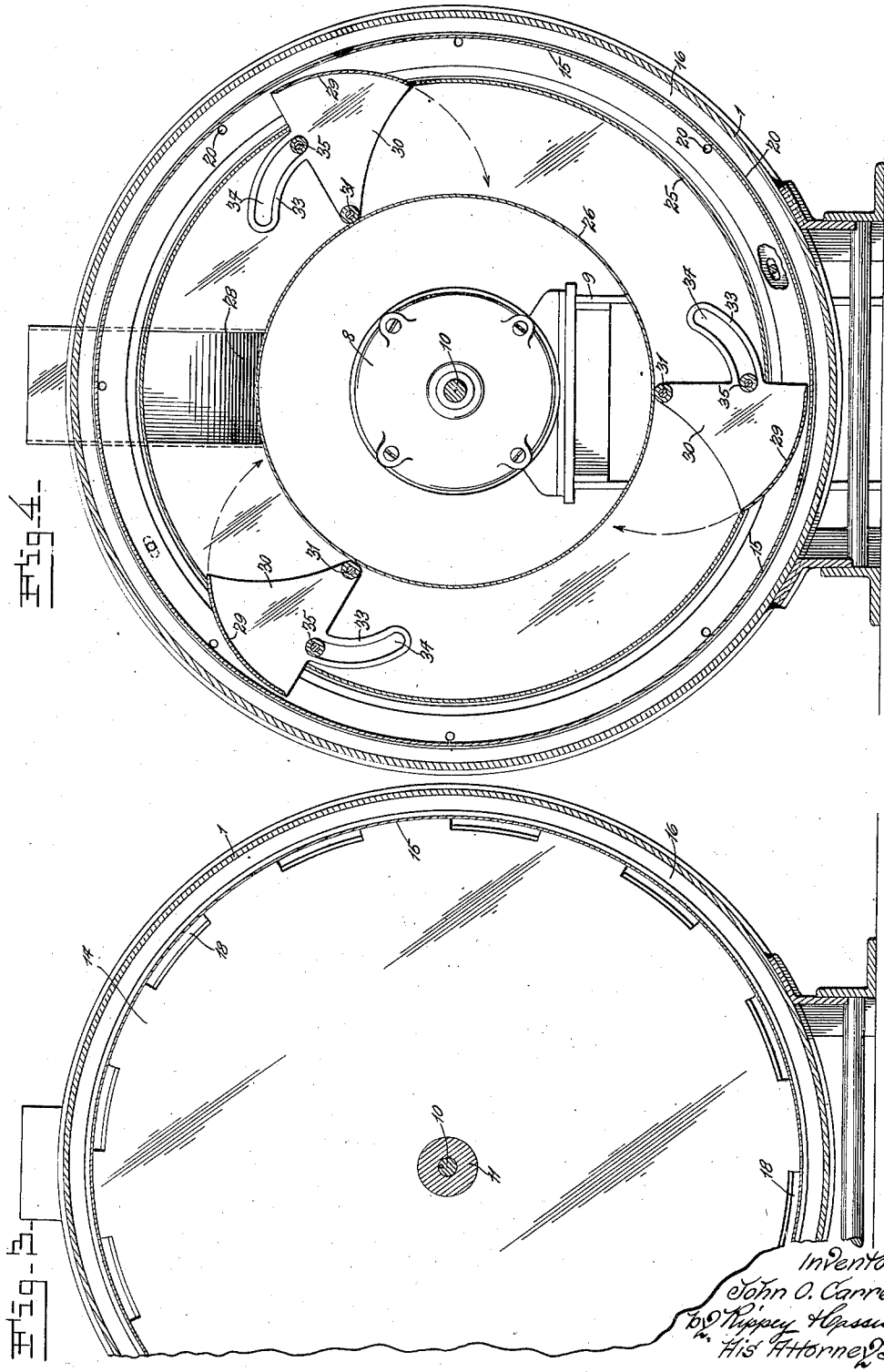

May 10, 1938. J. O. CARREY 2,116,595
SEPARATOR
Filed Aug. 10, 1935 3 Sheets-Sheet 3
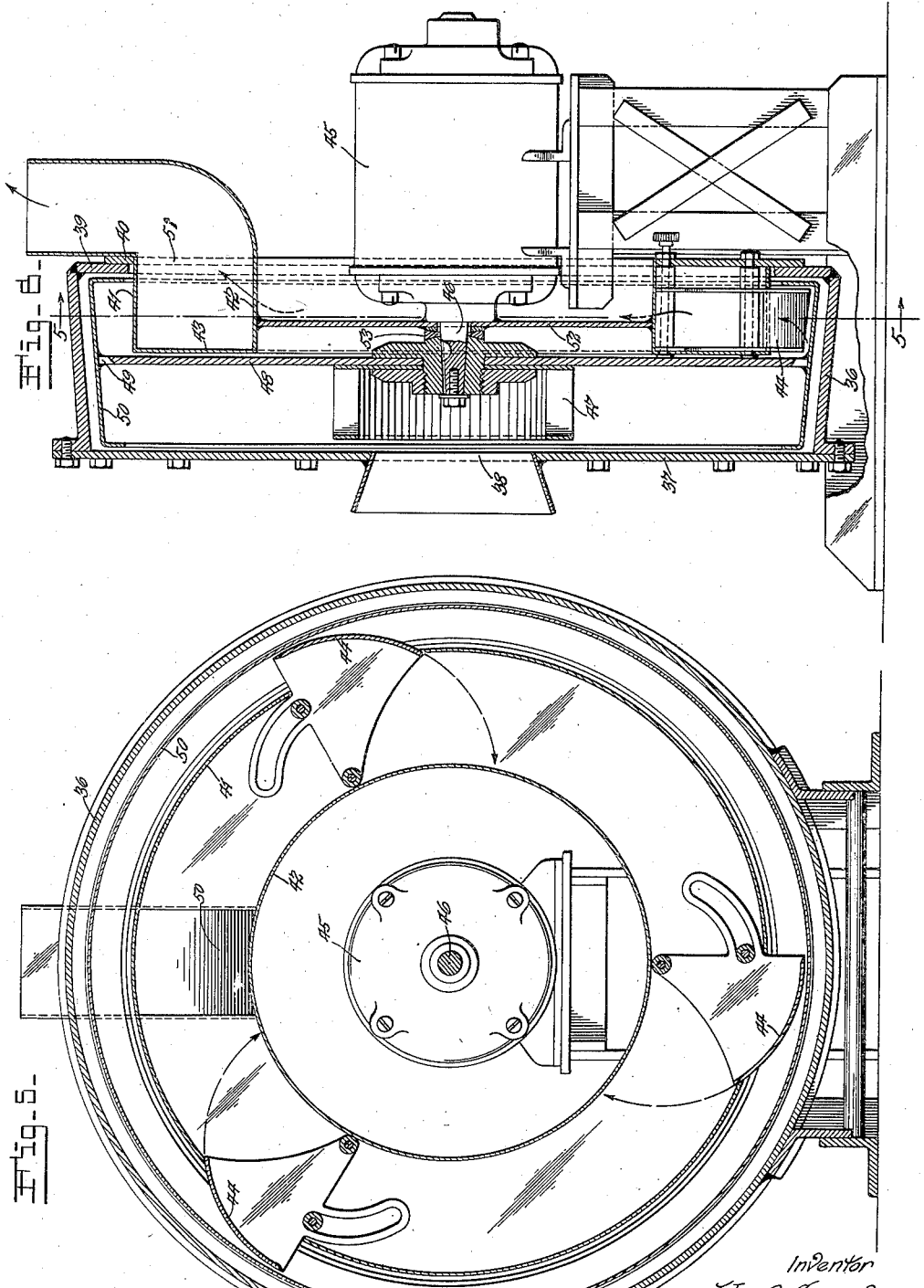
Inventor
John O. Carrey
by Rippey & Cassidy
His Attorneys Patented May 10, 1938

2,116,595

UNITED STATES PATENT OFFICE 2,116,595

SEPARATOR

John O. Carrey, St. Louis, Mo.; Frank J. Stretch, Jr., administrator of said John O. Carrey, deceased Application August 10, 1935, Serial No. 35,587

4 Claims. (Cl. 233—21)

This invention relates to separators.

An object of the invention is to provide a separator capable of use as a pump for separating elastic bodies or constituents of different densities, such as separating oxygen from nitrogen. In this operation, the device operates as a separator and a pump, and the invention includes a pump capable of use as such without functioning as a separator.

Accordingly, another object of the invention is to provide an improved pump adapted to be applied to many uses.

Other objects of the invention will be made apparent from the following description, reference being made to the annexed drawings, in which—

Fig. 1 is a front elevation of one embodiment of the invention.

Fig. 2 is a vertical transverse sectional view approximately on the line 2—2 of Fig. 1.

Fig. 3 is a sectional view on the line 3—3 of Fig. 2.

Fig. 4 is a sectional view on the line 4—4 of Fig. 2.

Fig. 5 is a sectional view on the line 5—5 of Fig. 6.

Fig. 6 is a vertical sectional view of a pump, omitting the equipment for separating the elastic bodies of different densities.

The combined pump and separator shown in Figs. 1 to 4, inclusive, comprises a tapered cylindrical frame or shell 1 having a plate 2 attached to the smaller end thereof and provided with an annular series of holes 3. A circular collector chamber 4 is attached to the plate 2 and the holes 3 open into said collector chamber, the walls of which are imperforate with the exception that an outlet passage 5 from said chamber is provided. The plate 2 is provided with a central inlet opening 6 surrounded by an outwardly flaring wall 7 constituting a passage through which air or other fluids may pass to the inner side of the plate 2.

A motor 8 is mounted upon a support 9 and rotates a shaft 10 to which a hub element 11 is attached. A blower device 12 of familiar construction is, or may be, attached to the hub element 11 by a nut 13 screwed on said hub element. This blower device is circular and is concentric with the inlet passage 6. In some embodiments of essential features of the invention for pump or separator functions, the blower device 12 may be omitted.

A disk plate 14 is also clamped on the hub element 11 by the nut 13 and has attached to its periphery a frusto-conical wall 15 concentric with the shell 1 and separated therefrom by an intervening space 16. The smaller end of the tapered wall 15 has an inwardly extended flange 17 which does not obstruct the holes 3. A number of holes or passages 18 are formed in the marginal portion of the disk 14 adjacent to the wall 15. The larger end of the cylindrical wall 15 is provided with an inwardly extended flange 19 having therethrough an annular series of holes 20 adjacent to the inner surface of the wall 15. A ring 21 is adjustably mounted on the wall 15 and against the flange 19 and has holes 22 therethrough which may be placed in communication with the holes 20. The ring 21 constitutes a species of valve whereby the holes 20 and 22 may be brought into complete registration, or out of complete registration, to vary the size of the ports or passages formed by said holes 20 and 22. The valve may be held in any of its adjusted positions either by friction or any known devices. These valve ports 20 and 22 function to separate or skim off that portion of gases or fluids that do not pass out through the collector 4.

A ring 23 is attached to the larger end of the shell 1 and extends inwardly. A collector chamber is supported by the ring 23 and comprises an outer wall 24 which is attached to the ring 23 and cooperating circular walls 25 and 26 attached to the wall 23 and extending inwardly and connected with an inner wall 27. Thus, the walls 24, 25, 26 and 27 form an annular collector chamber which is provided with an outlet opening 28. A wall 27' may be attached to the inner side of the annular wall 26 and provided with an hermetic joint 28' with a part of the motor 8. This wall 27' is imperforate and it forms a leak-proof joint with the wall 26 so that the fluid cannot escape but is required to enter the collector device.

A number of baffles or scoops are supported by the walls 24 and 27, each scoop comprising an arcuate wall 29 and a pair of side walls 30. These scoops extend through openings in the wall 25 in the manner shown in Fig. 4, and each scoop has one edge near the wall 15. The scoops are attached to rods 31 rotatively supported by the walls 24 and 27 adjacent to the wall 26. These rods 31 may be turned to move the scoops to any desired adjusted positions as required by the use to which the machine is applied. The rods 31 may be held from accidental turning by any appropriate means such as clamping nuts 32 (Fig. 2). Each of the walls 30 may be provided with an arcuate arm 33 having a curved slot 34 through which a supporting rod 35 extends. The rods 35 are supported by the walls 24 and 27 adjacent to the wall 25.

When the motor is operating, the blower or impeller 12, the disk 14 and the parts supported by said disk are rotated at high speed. Air or other elastic bodies may enter the machine through the passage 6 and will be driven outwardly toward the wall 15. The lighter constituent will pass through the holes 3 into the collector 4 and thence outwardly through the outlet 5. The heavier constituent will pass through the holes 18 and the greater portion thereof will be forced into the collector chamber formed by the walls 24, 25, 26, and 27 by the continued pressure resulting from the continuous supply of the heavier constituent passing through the holes 18. This pressure will also force the heavier constituent out through the outlet 28 and thence to any selected point of delivery.

In these particulars, the machine functions as a combined pump and separator.

By suitable modification, the machine may be caused to function as a pump for fluids. As shown in Figs. 5 and 6, the pump comprises a tapered wall or frame 36 having a plate 37 attached to the smaller end thereof and provided with an inlet opening 38. The rear end of the pump comprises an inwardly extended ring 39 attached to the larger end of the wall 36 and supporting a collector device comprising walls 40, 41, 42, and 43 and having mounted therein scoops 44 in the same manner that the scoops shown in Fig. 4 are mounted.

The motor 45 drives the shaft 46, which supports the blower or impeller 47 of suitable design and a disk 48 having peripheral holes 49 adjacent to the tapered wall 50 attached to said disk.

When the motor 45 is operating, the blower or impeller 47, the disk 48 and other parts supported by said disk are rapidly rotated, with the result that the fluid entering the pump is forced through the holes 49 and, by continuous flow, is forced through the scoops 44 into the collector chamber and thence through the outlet 51.

A wall 52 is attached to the inner side of the annular wall 42 and forms an hermetic joint 53 with a part of the motor 45, so that the fluid cannot escape but is required to enter the collector device.

The operation of this pump is now apparent from the description of the construction thereof, considered with the description of the operation of the combined pump and separator.

The invention may be varied in many other particulars without departure from the nature and principle thereof.

I claim:—

1. A machine of the character described comprising a rigid housing having an inlet opening at one side and an outlet opening at the opposite side, a disc in said housing between said openings and having holes therethrough near its margin, a frustro-conical member attached to margin of said disc approximately midway of its length and tapering toward the side having said inlet opening and flaring from said disc toward the side having said outlet opening, mechanism for rotating said disc and thereby said member, an approximately radial flange extending inwardly from the larger end of said member and having holes therethrough near the inner side of said member, and a ring adjustably mounted on said member against said flange and having holes therethrough which may be placed in communication with said holes through said flange.

2. A machine of the character described comprising a rigid housing having an inlet opening at one end and outlet openings at its respective ends, a rotary disc in said housing between said outlet openings and between said inlet opening and one of said outlet openings and having holes through its margin, a frustro-conical member attached to the periphery of said disc approximately midway of its ends and having approximately radial inwardly extending flanges on its opposite ends, said flange at the larger end of said member having openings therethrough for the passage of fluid, means for regulating the passage of fluid through said openings in said flange, mechanism for rotating said disc and thereby said member, a centrifugal impeller attached to and rotated by said disc adjacent to said inlet opening, and collectors attached to said housing for receiving fluids for discharge through said outlet openings at opposite sides of said disc.

3. A machine of the character described comprising a rigid housing having an inlet opening at one end and outlet openings at its respective ends, a rotary disc in said housing between said outlet openings and between said inlet openings and one of said outlet openings and having holes through its margin, a frustro-conical member attached to the periphery of said disc approximately midway of its ends and having approximately radial inwardly extending flanges on its opposite ends, said flange at the larger end of said member having openings therethrough for the passage of fluid, means for regulating the passage of fluid through said openings in said flange, mechanism for rotating said disc and thereby said member, a centrifugal impeller attached to and rotated by said disc adjacent to said inlet opening, collectors attached to said housing for receiving fluids for discharge through said outlet openings at opposite sides of said disc, and a series of baffles mounted in one of said collectors for causing fluids to pass into said collector.

4. A machine of the character described comprising a housing having opposed inlet and outlet openings, spaced fluid collectors attached to said housing and one of said collectors communicating with one of said outlet openings, a disc in said housing between said collectors and having holes therethrough near its margin for the passage of fluids toward said one collector, a centrifugal impeller attached to said disc adjacent to said inlet opening, a frustro-conical member attached to said disc approximately midway of its ends and having its larger end beyond said disc toward said one outlet opening and its smaller end surrounding said impeller and extending toward said inlet opening and said other collector, means for regulating the discharge of fluid from the larger end of said member, means connecting said other collector with said other outlet opening in communicating relation therewith, and mechanism for rotating said disc and thereby said member and said impeller.

JOHN O. CARREY.